Jan. 25, 1966      J. H. MacNEILL      3,231,720

SOLENOID ACTUATED READER

Filed Jan. 17, 1962      7 Sheets-Sheet 1

INVENTOR
JOHN H. MACNEILL

BY *Hurvitz & Rose*

ATTORNEYS

Jan. 25, 1966  J. H. MacNEILL  3,231,720
SOLENOID ACTUATED READER

Filed Jan. 17, 1962  7 Sheets-Sheet 2

INVENTOR
JOHN H. MacNEILL

BY *Hurvitz + Rose*

ATTORNEYS

INVENTOR
JOHN H. MacNEILL

BY Hurvitz & Rose
ATTORNEYS

Jan. 25, 1966  J. H. MacNEILL  3,231,720

SOLENOID ACTUATED READER

Filed Jan. 17, 1962  7 Sheets-Sheet 4

INVENTOR
JOHN H. MacNEILL

BY *Hurvitz & Rose*

ATTORNEYS

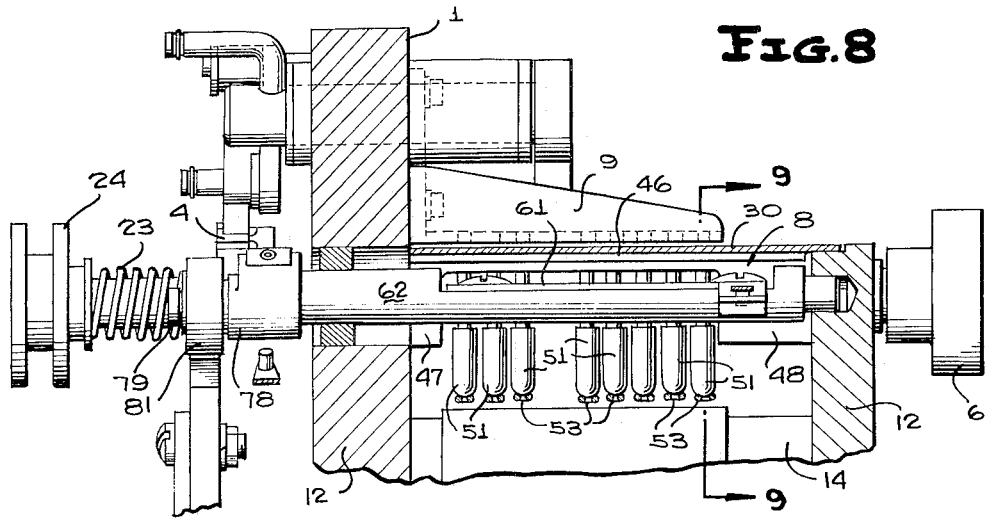
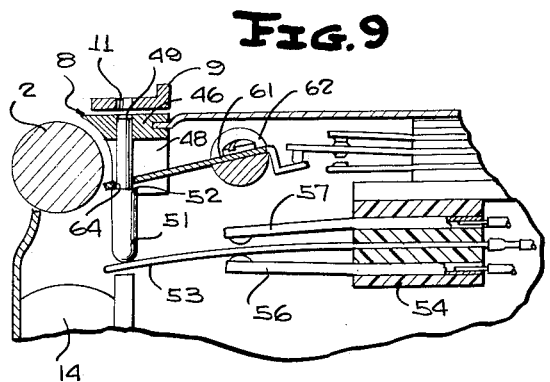
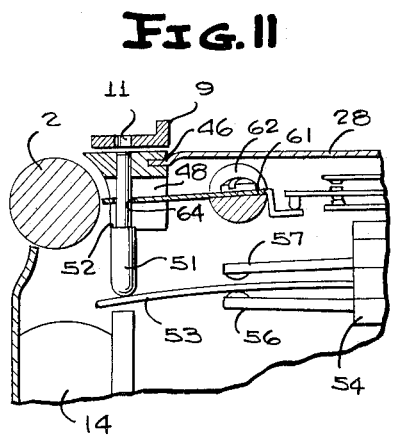
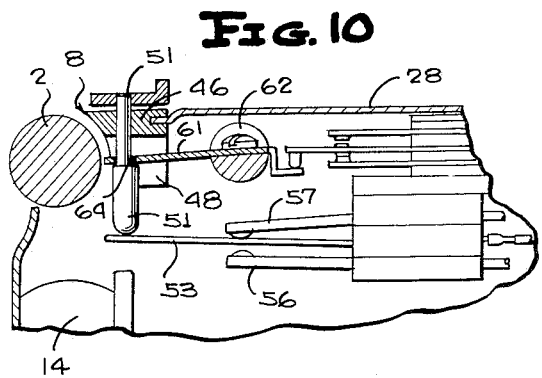

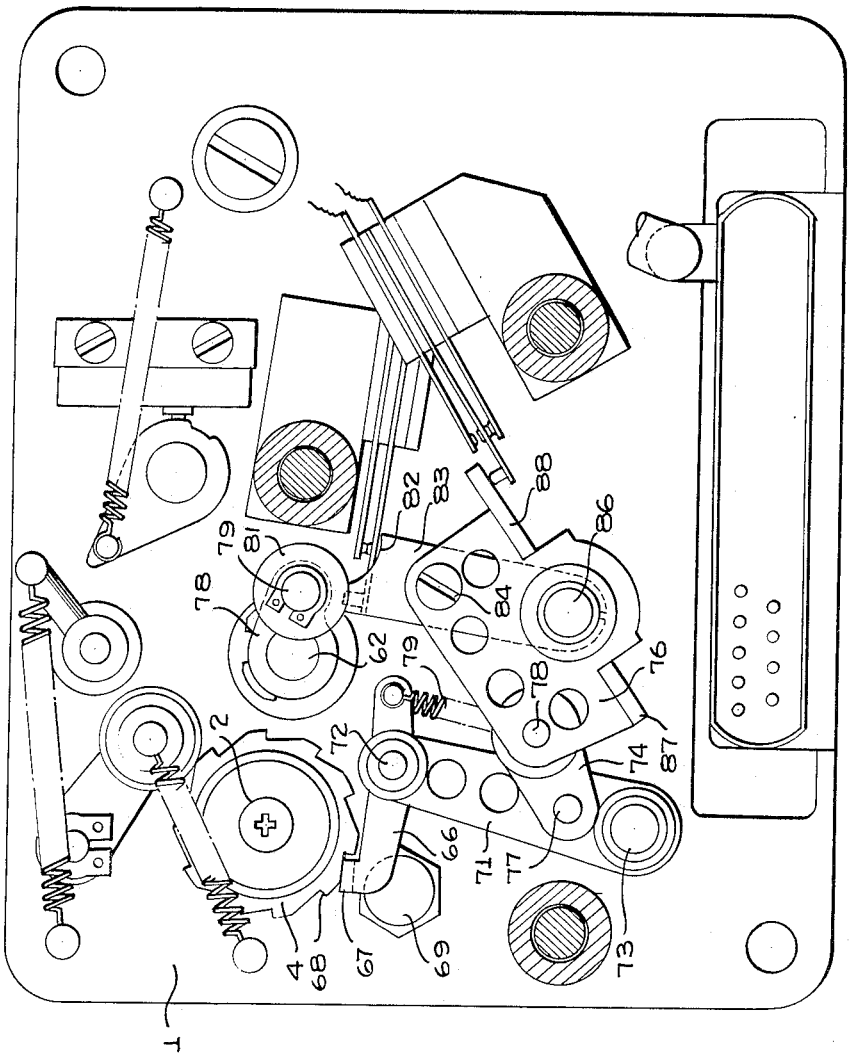

Jan. 25, 1966         J. H. MacNEILL         3,231,720
           SOLENOID ACTUATED READER
Filed Jan. 17, 1962                    7 Sheets-Sheet 7

INVENTOR
JOHN H. MACNEILL

BY *Hurvitz & Rose*

ATTORNEYS

United States Patent Office 3,231,720
Patented Jan. 25, 1966

3,231,720
SOLENOID ACTUATED READER
John H. MacNeill, Indialantic, Fla., assignor to Soroban Engineering, Inc., Melbourne, Fla., a corporation of Florida
Filed Jan. 17, 1962, Ser. No. 166,744
9 Claims. (Cl. 235—61.11)

The present invention relates to reading mechanisms for perforated members and more particularly to a solenoid actuated mechanism for reading perforations in the punched paper tape.

It is an object of the present invention to provide a solenoid actuated reading mechanism for a punched paper tape in which erroneous readings resulting from bounce of the armature of the solenoid are prevented.

It is yet another object of the present invention to provide a rotary solenoid-actuated paper tape reading mechanism in which the bounce normally encountered in the rotary solenoid operation is isolated from the reading mechanism thereby eliminating erroneous readings which would normally result from the transmission of the bounce to the contacts sensing movement of the reading pins.

It is yet another object of the present invention to isolate the reading pins of a rotary solenoid-actuated, perforated-tape reading mechanism by employing a cam and cam follower arrangement contoured such that small oscillations of the cam at the end of the stroke of the solenoid due to the normal bounce of the solenoid armature are not transmitted to the cam follower.

It is still another object of the present invention to provide a reading mechanism for punched paper tapes having different code levels and employing standard and inverse code arrangements on the tape.

It is still another object of the present invention to employ self-lubricating plastic sensing pins and a simplified arrangement for supporting and moving the pins.

It is still another object of the present invention to employ a sensing pin supporting and actuating arrangement in perforated member sensing mechanisms in which the actuating mechanism provides a portion of the support mechanism for the sensing pins.

It is still another object of the present invention to provide a sensing pin guiding and retaining mechanism in which the upper end of the sensing pin is guided by stationary guide block and the lower end of the sensing pin is guided by the pin actuating mechanism, thereby greatly simplying the pin guiding and actuating structures.

The above and still further objects, features and advantages of the present invention will become apparent upon consideration of the following detailed description of one specific embodiment thereof, especially when taken in conjunction with the accompanying drawings, wherein:

FIGURE 8 is a partial sectional view in elevation illustrating the sensing bail and sensing pins;

FIGURE 9 is an enlarged partial sectional view illustrating the sensing bail pins and sensing switches in an inactive position;

FIGURE 10 illustrates the mechanism of FIGURE 9 in a sensing position;

FIGURE 11 is a partial sectional view in elevation illustrating the situation when the sensing pin is restrained by a non-apertured area of a card being sensed;

FIGURE 12 is a view in elevation of the back of the apparatus during non-sensing operation;

Figure 1:
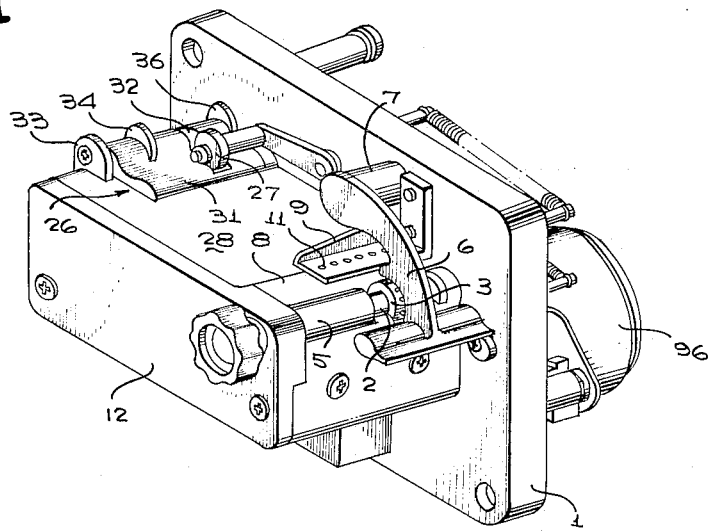
FIGURE 1 is a view in perspective of the front of the apparatus.
Figure 2:
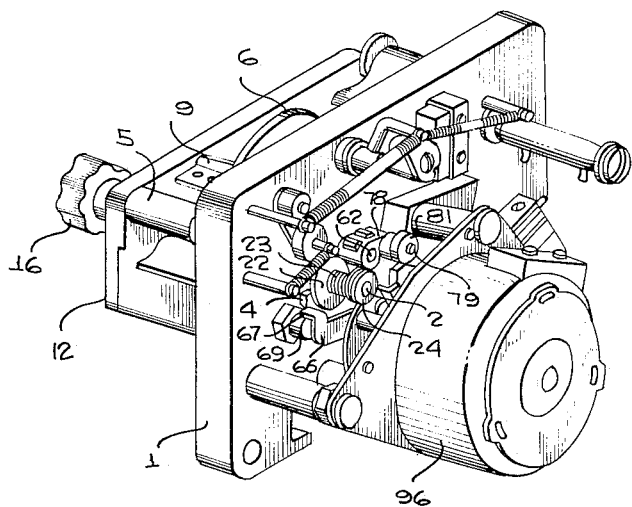
FIGURE 2 is a view in perspective of the back of the apparatus.
Figure 3:
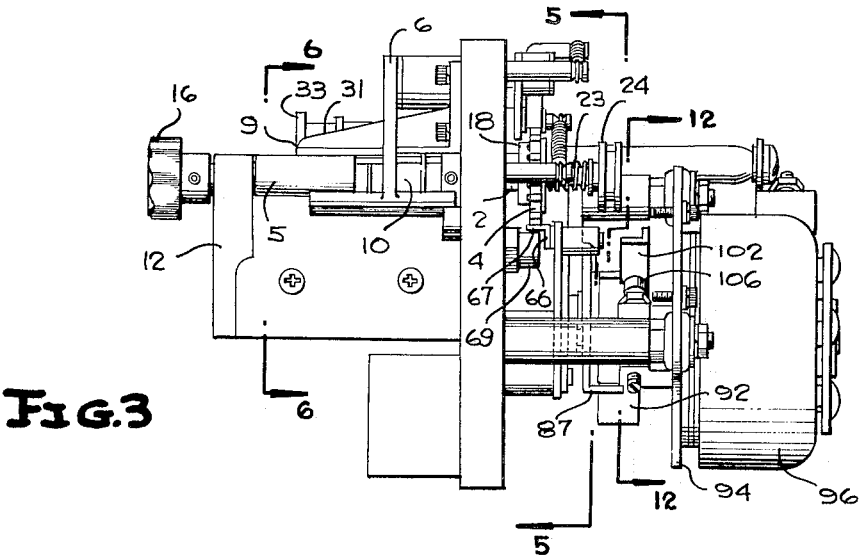
FIGURE 3 is a view in elevation showing both the front and back portions of the apparatus.

Referring now specifically to FIGURES 1 and 2, of the accompanying drawings which are perspective views of the front and back of the apparatus, respectively, there is provided a main support plate 1 which is adapted to be mounted on a panel of a console and support the mechanism in the intended structural environment. Journaled in and extending perpendicular to the plate 1 is a shaft 2 (see also FIGURE 7) carrying on the forward side of the plate 1 a drive sprocket 3 and carrying on the rear side of the plate 1 a drive ratchet 4. There is provided a tape depressor 6 secured to a shaft 7 journaled in the plate 1, which depressor is adapted to force the tape being read against the sprocket 3 and retain the teeth on the sprocket 3 in engagement with the holes on the tape to insure movement of the tape upon rotation of the sprocket. The tape passes between a guide block 8, for a plurality of sensing pins, and an upper guide 9. The sensing pins are supported in holes on the guide block, to be described subsequently in detail, and when sensing a perforation or perforations in the paper tape enter clearance holes 11 in the upper guide member 9.

The shaft 1 and reference is again made to FIGURE 7 is, as indicated, journaled in the main frame member 1 and also in an outer wall member 12. The wall member 12 is secured to the frame member 1 and spaced therefrom by generally rectangular bars 13 and 14 (see FIGURES 6 and 7). A free turning cylinder 5 is disposed about the shaft 2 between the wall 12 and a sleeve 10. The sleeve 10 is disposed about and is secured to the shaft 2 for rotation therewith. The drive sprocket 3 is secured to the sleeve 10. The shaft 2, forwardly of the end wall 12, that is, to the left thereof as viewed in FIGURE 1, is provided with a knurled or fluted knob 16 adapted to be employed by an operator to manually advance the tape. In order to permit such operation the drive ratchet 4 must be capable of remaining stationary during such interval and this is accomplished by a mechanism more fully illustrated in FIGURE 7.

Figure 7:
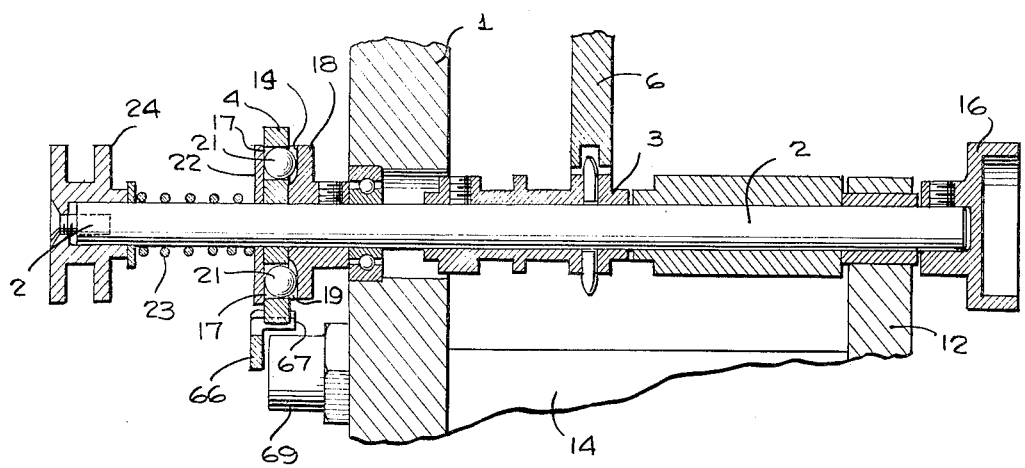
FIGURE 7 is a partial sectional view illustrating the drive shaft and sprocket mechanism.

Referring to FIGURE 7 the drive ratchet 4 is provided with a plurality of transverse apertures 17 two of which are illustrated in FIGURE 7 and in which balls 21 are disposed. Situated between the wall 1 and the ratchet 4 and secured to and concentric with the shaft 2 is a first clutch member 18 having a vertical face, as illustrated in FIGURE 7, facing the ratchet 4 and in engagement therewith. This face of member 18 is provided with a plurality of grooves 19 which are adapted to receive the balls 21 disposed in the aperture 17 in the ratchet 4. A plate 22 is disposed about the shaft 2 and is axially movable therealong. The plate 21 is spring biased by means of a spring 23 into engagement with a vertical face of the ratchet 4 on the opposite side from the clutch member 18. The spring 23 is maintained under compression by means of a pulley member 24 secured to the end of the shaft 2 and employed to drive a belt connected to the tape take-up reel.

The plate 22 presses the balls 21, under the force of the spring 23, into the grooves 19 formed in the face of the clutch member 18 and upon rotation of the ratchet 4 the balls cause the clutch member 18 to rotate. Since clutch member 18 is secured to the shaft 2, the shaft rotates. However, if the knob 16 is rotated and the ratchet 4 is held in position by means of a pawl to be described subsequently, then the balls 21 move up inclined surfaces formed by grooves 19 on the clutch member 18 and force the plate 22 toward the left as illustrated in FIGURE 7, thereby permitting the member 18 to rotate relative to the balls and therefore relative to the member 4. In consequence, advance of the tape may be effected manually without disturbing the pawl and ratchet drive mechanism to be described in detail subsequently.

Referring again to FIGURE 1, the tape comes in from the left rear of the mechanism, as illustrated in FIGURE 1, and passes over a mechanism 26 and concurrently under a depressor or roller 27 before passing between the guide members 9 and 8 and proceeding between the sprocket 3 and depressor 6. The mechanism 26, and reference is now made to FIGURES 1, 3, 4 and 12, is carried on a generally L-shaped sheet metal member 28 forming a cover for the back part of the assembly. A vertical leg of member 28 is secured to the left side of the support 13, as viewed in FIGURE 6, and a horizontal leg of member 28 proceeds along the top of the wall 12 having a lip 29 at its right end, as viewed in FIGURE 6, which is received in a groove 30 in an upper portion of the left vertical face, again as viewed in FIGURE 6, of the guide block 8.

Figure 4:
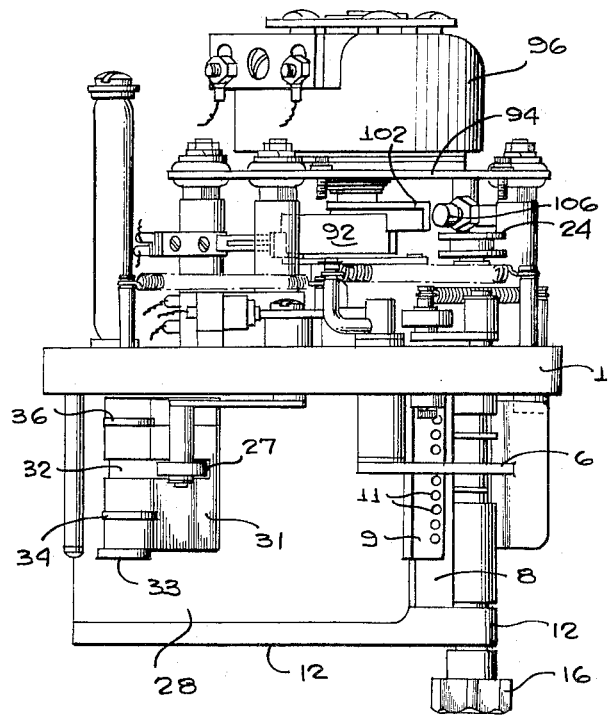
FIGURE 4 is a top view of the apparatus.
Figure 5:
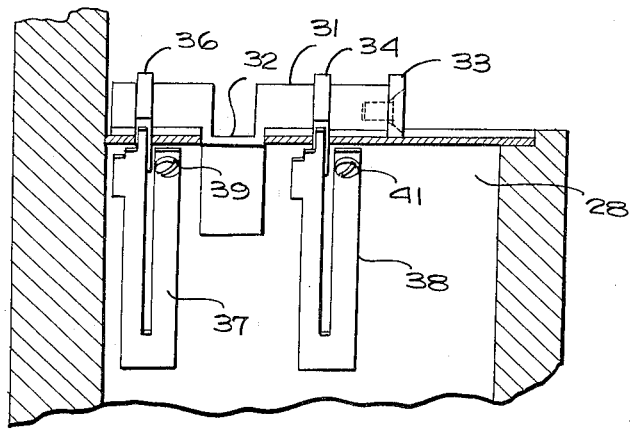
FIGURE 5 is a partial view in section of the underside of the tape guide mechanism.

Referring now specifically to FIGURES 1, 4 the tape guiding mechanism 26 includes a generally curved block 31 over which the tape passes and follows a gradual curve along the block 31 down to the horizontal surface of member 28. The block 31 is provided with a relatively deep groove 32 adapted to receive the roller 27 so that the roller is supported entirely by the tape and therefore insures that the tape is maintained in contact with the member 31.

An end plate 33 is secured to the left edge of the plate 31 and provides a predetermined spacing between the wall of the main support plate 1 and the member 33, this spacing being equal to the width of an eight level code tape. Such a tape is depressed into contact with the upper surface of the block 31 and is guided between the wall 1 and the vertical member 33.

The plate 31 is further slotted to receive two ears or tabs 34 and 36 which may reciprocate vertically under the weight of the tape. If an eight level code tape is employed then both of the members 34 and 36 are depressed. If a five level tape is employed then the tab 34 remains upright and the tab or ear 36 is depressed. Guiding of the tape then occurs between the member 34 and the adjacent wall of the main support plate 1. If an inverse five level code tape is employed; that is, if the normal arrangement of the group of two and three holes on opposite sides of the feed holes which are engaged by the teeth or ratchet 33 is reversed, then guiding may be provided between the end guide member 33 and the tab 36. In this case the tab 34 is depressed. It is thus seen that any level code between five and eight level may be accepted by the mechanism and tapes employing inverse codes of various levels may also be accommodated.

The tabs 34 and 36 are biased upwardly as viewed in FIGURE 1 by means of U-shaped or folded leaf springs 37 and 38. The springs 37 and 38 have one end secured to the bottoms of the tabs 34 and 36 and the other ends of the springs are secured to the under side of the plate 28 by means of suitable screws 39 and 41 respectively. Of course, other means of securing the springs to the plate 38 and other types of spring may be employed.

Figure 6:
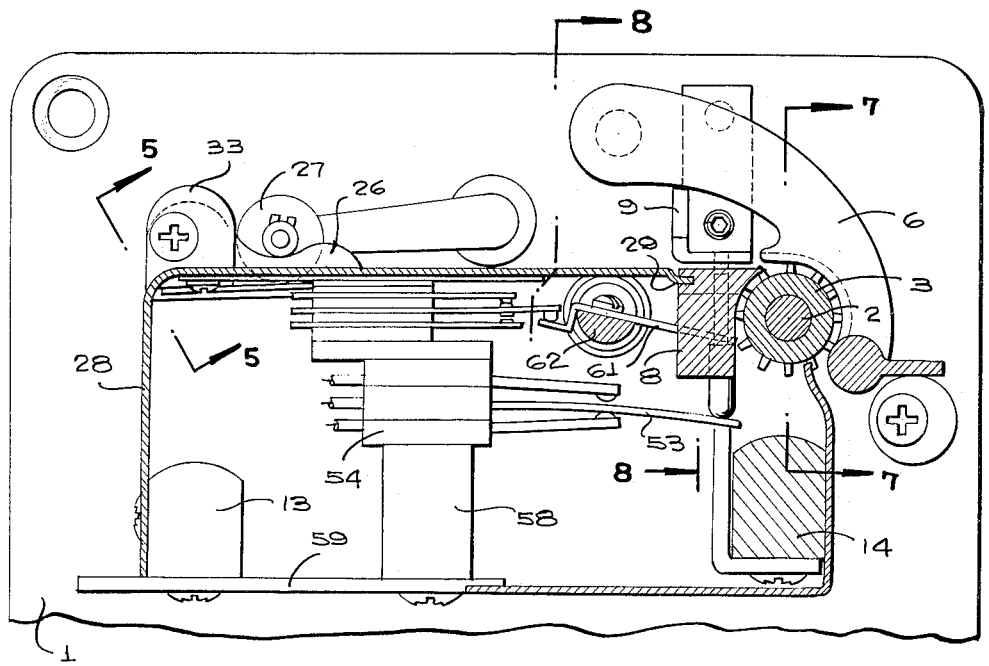
FIGURE 6 is a partial sectional view in elevation of the front portion of the apparatus illustrating the sensing and feed mechanisms.

Referring now specifically to FIGURES 6 through 11, there are illustrated various views of tape sensing mechanism of the present invention. The guide block 8 as viewed right in FIGURE 6 in FIGURE 8 is an inverted U-shaped member comprising a cross bar 46 forming the bottom of the U and two end members or downwardly extending legs 47 and 48 secured to the frame member 1 and wall 12, respectively. The cross member 46 is provided with a plurality of suitably spaced apertures 49 each adapted to receive the upper end of a sensing pin 51. The upper ends of the sensing pins 51 are of a reduced diameter relative to the lower ends thereof and the region at which these two portions meet defines a circular horizontally arranged shoulder 52. The lower ends of the sensing pins 51 rest on leaf springs 53 comprising a pair of wires joined by a curved portion at their left ends as viewed in FIGURES 9 through 11 and which at their right ends are secured in a body of plastic material 54. The leaf springs 53 not only provide an upward force on the bottom of the sensing pins 51 but also constitute a movable contact of a set of single-pole, double-throw switches each including a lower stationary contact 56 and an upper stationary contact 57, the right ends of which are also embedded in the plastic body 54. The plastic body 54 is supported on a pair of posts 58, only one of which is illustrated in FIGURE 6, the posts 58 being in turn carried by a horizontal plate 59 secured to the bottom of the cross bar member 13. When the pins 51 are in their downward position, as illustrated in FIGURE 9, the contact member 53 engages the stationary contact 56 of each of the switch arrangements this being taken to indicate a no-hole condition on the tape. The pins 51 are normally held in their downward position by means of a bail 61 which constitutes a flat plate secured to a shaft 62 journaled in the frame or wall member 1 and also the wall 12. The shaft 62 is grooved over a predetermined portion thereof to provide a flat surface against which the bail 61 is seated and bolted. The left end of the bail 61 as viewed in FIGURES 9 through 11 is provided with a plurality of apertures 64 each one adapted to receive the upper end of a sensing pin 51; that is, the end of reduced diameter. When the shaft 62 as viewed in FIGURE 9 is in a counterclockwisemost position, the lower surface of the bail 61 engages the shoulder 52 of each of the sensing pins 51 and depresses the pins against the force of the left spring contact 53 thereby holding the pins below the upper surface of the portion 46 of the guide plate 8. Upon clockwise rotation of the shaft 62, the bail 61 in the region of pin 51 is raised permitting the pin to rise under the force of the leaf spring 53. If a hole is presented above a pin, the pin 51 rises through the hole in the tape and into the aligned aperture 11 in the upper guide member 9. In so doing the leaf spring 53 disengages the stationary contact 56 and becomes engaged with the stationary contact 57, thereby indicating to the external circuits that a hole has been sensed. However, if the pin 51 engages an unperforated portion of the tape, the upper surface of the pin is maintained approximately level with the upper surface of the guide block 8 this being illustrated in FIGURE 11 and the pin 51 does not rise sufficiently to permit the leaf spring contact 53 to become disengaged from the stationary contact 56. Therefore the condition remains essensitially unchanged from that illustrated in FIGURE 9 thereby indicating a lack of a hole or aperture in the tape at this location of the tape.

It will be noted that the guiding of each pin 51 is effected entirely by a small vertical portion 46 of the guide block 8 and by the aperture 64 in the bail 61. The guide block therefore is quite simple comprising an easily formed U-shaped member having a plurality of holes drilled therein since only the upper ends of the pins need be guided, the remainder of the guiding being provided by the bail. The pins are preferably of a self-lubricating plastic material, for instance Delrin, which is relatively tough and is of sufficient rigidity to maintain its shape over extended period of use in spite of the relatively small amount of guiding provided by the apparatus.

In the operation of the apparatus, a sensing operation occurs first and thereafter a feed operation occurs. More particularly, the shaft 62 is rotated clockwise, as illustrated in FIGURES 9 through 11, and then the shaft 2 is rotated counterclockwise by a distance determined by the normal spacing between the columns of apertures in a punched paper tape or other suitable apertured memory element for which the apparatus is designed. The apparatus for effecting the sensing and then feed of the perforated record member is illustrated in FIGURES 2 through 4, 12 and 13. Referring now specifically to these figures, the ratchet 4 is adapted to be actuated by means of a pawl generally designated by the reference numeral 66. The pawl is provided with a pawl tooth 67 lying in the horizontal plane as illustrated in FIGURE 12 and which extends into engagement with teeth 68 on the ratchet 4. The tooth 67 is disposed over the top of a stud 69 secured to the wall 1.

The pawl 66 is pivotally secured to a rocker arm 71 by means of a pin 72, the rocker arm 71 extending generally downwards as illustrated in FIGURE 12 and being pivoted about a shaft 73. A link 74 extends between the arm 71 and a plate 76, the link 74 being pivoted to the members 71 and 76 by pivot pins 77 and 78, respectively. A spring 79 extends between the right end of the pawl 66 and the pivot pin 78 tending to cause the pawl 66 to pivot in a clockwise direction as illustrated in FIGURE 12 about the pivot pin 72.

Figure 13:
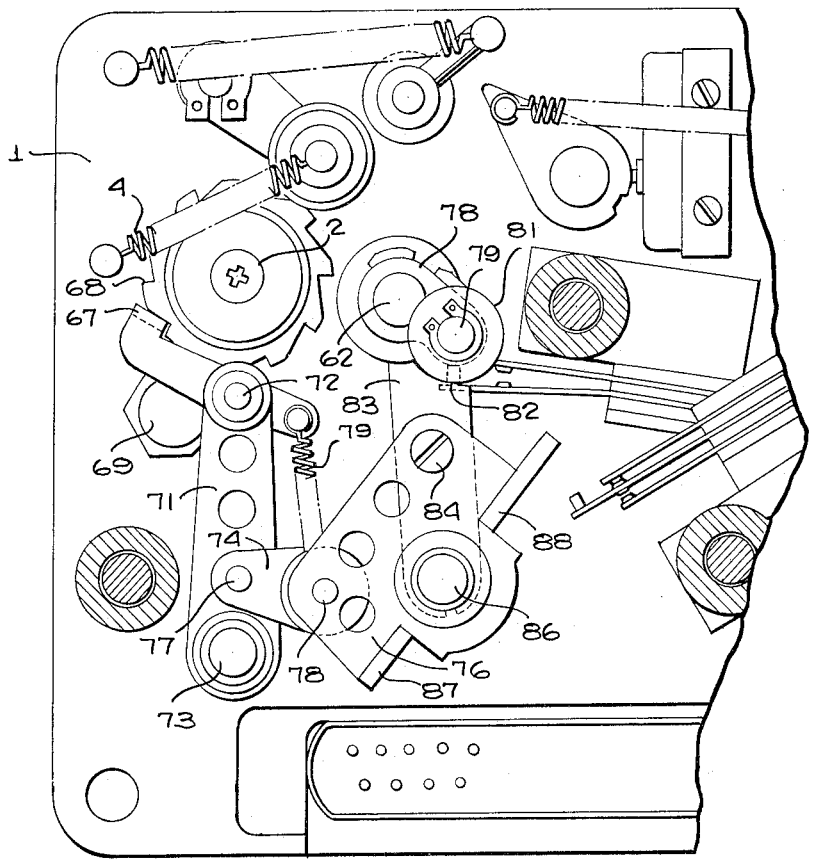
FIGURE 13 is a view in elevation of the back of the apparatus during a sensing operation.

Referring now to shaft 62, an arm 80 secured to the shaft 62 carries on the right end thereof as viewed in FIGURES 12 and 13 a shaft 85 having rotatably secured thereto a circular cam follower 81. The rotatable cam follower 81 engages a cam surface 82 formed on the upper end as viewed in FIGURES 12 and 13 of a flat plate 83. The plate 83 is secured as by bolt 84 to the plate 76 and is rotatable with the plate 76 about a shaft 86. In the position of the plate 83 illustrated in FIGURE 12, the shaft 62 cannot rotate clockwise because the cam surface 82 has a segment 75 under and in contact with cam follower 81. However, upon rotation around shaft 86 of plate 76 and plate 83, the segment 75 of the cam is withdrawn and the cam follower 81 and therefore shaft 62 may rotate clockwise. This permits the bail 61 to rise. The rotation of the plate 76 also causes the link 74 to assume a generally horizontal position and in so doing causes the arm 71 to rotate counterclockwise. Upon counterclockwise rotation of the arm 71, the pawl tooth 67 is moved to the left and under the force of the spring 79, which is increased upon downward movement of the pin 78 with rotation of the plate 76, the pawl 66 is caused to rotate clockwise about the pivot pin 72 and maintain engagement with the teeth 68 of the ratchet 4. The pawl tooth 67 comes into engagement with a new tooth 68 of the ratchet at the end of its stroke.

Figure 14:
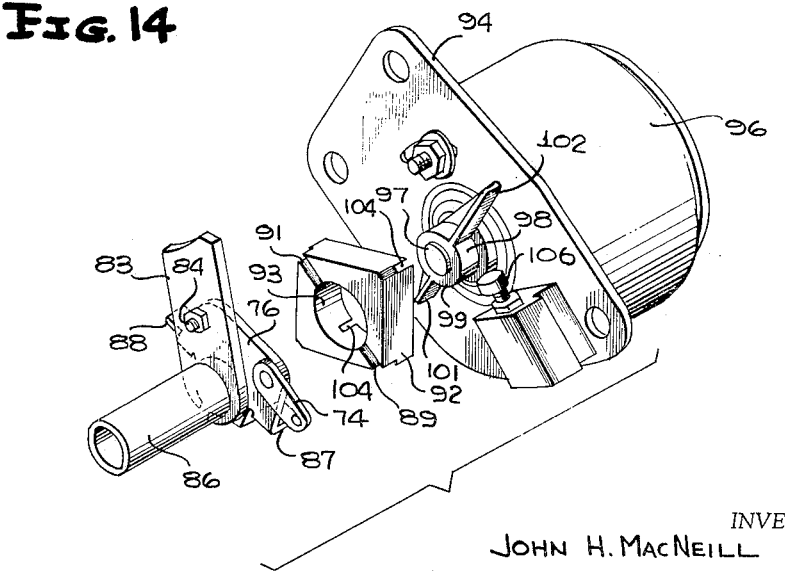
FIGURE 14 illustrates the mechanism for cooling the rotary solenoid to the drive mechanism of FIGURES 12 and 13.

Upon subsequent clockwise rotation of the plate 76, back to the position illustrated in FIGURE 12, initially the cam follower 81 is lifted and thereafter the pawl tooth 67 engages the leading or clockwise edge of the new tooth of the ratchet and produces rotation thereof. It will be noted that when the plate 76 has rotated to its maximum position counterclockwise, the adjacent edges of the pawl tooth 67 and the leading edge of the tooth 68 of the ratchet 4 are spaced from one another by a predetermined distance approximately between a sixteenth and an eighth of an inch in the illustration of FIGURE 13. This spacing is sufficient when taken in conjunction with the contour of the cam surface 82 of the plate 83 to withhold movement of the ratchet 4 and therefore of the shaft 2 until the cam follower 81 is raised sufficiently to permit withdrawal of the upper ends of the sensing pins 51 from the apertures in the tape. When the pins are just about even with the upper surface of the plate 8, the pawl tooth 67 engages the leading edge of the ratchet tooth 68 and initiates rotation of the shaft 2. Therefore, the feed operation occurs after, and only after, completion of the sensing operation. The plate 76 is rotated by means of a solenoid and drive arrangement illustrated in FIGURE 14. The plate 76 carries two generally horizontal tabs 87 and 88 directed away from the wall 1. The tabs 87 and 88 are spaced on opposite sides of the shaft 86 and lie along a line extending through the center of the shaft perpendicular to its axis. These tabs extend into slots 89 and 91, respectively, in a generally square block 92 having a central aperture 93. Secured to a plate 94 is a rotary solenoid 96 having a shaft 97 which extends through the plate. The shaft 97 carries on the side of the plate 94 opposite to the location of the solenoid 96, a member 98 having a hub 99 secured to the shaft 97 and having a pair of diametrically opposed outwardly extending arms 101 and 102. The arms extend perpendicular to the axis of the shaft 97 but lie in the same plane as the shaft and extend into slots 103 and 104 formed in the block 92. The slots 103 and 104 are diametrically opposed to one another and are located at 90° relative to the slots 89 and 91. The slots 103 and 104 receive the arms 101 and 102 respectively of member 98 so that upon rotation of the shaft 97 and therefore the arms 101 and 102, the block 92 is rotated. As a result of the placement of the tabs 87 and 88 of the plate 76 in the slots 89 and 91 of the block 92 the plate 76 is also rotated. This arrangement is employed to take up the axial movement of the shaft 97 resulting from energization of the solenoid 96. As indicated the solenoid 96 is a rotary solenoid and in such devices not only is the shaft rotated but it is also translated along its axis. The arrangement of the various arms, and the slots in the block 92 permit this translation of the shaft to be taken up in the lost motion coupling so that only rotation is transmitted to the plate 76.

The plate 94 is supported by three studs 105 secured to the wall 1.

It is common knowledge that rotary solenoids being relatively rapidly operating devices and having some inertia, tend to bounce upon reaching their maximum degree of rotation. Upon energization of the solenoid and reference is now made to FIGURE 14, the shaft 97 rotates clockwise and upon reaching its maximum displacement, as determined by a stop mechanism 106, the shaft bounces; that is, rebounds from the stop and rotates somewhat counterclockwise and, then, since the solenoid 96 is still energized, again rotates clockwise and maintains, at this time or at some subsequent time after other bounces its clockwisemost position. The problem of obtaining exact and precise closing of the sensing contacts 53, 56, 57 is always difficult where leaf springs are employed. Thus, one may readily obtain the proper setting of the leaf spring 53 relative to the stationary contacts 56 and 57 but after repeated use these settings become disrupted and even a slight bounce of the solenoid shaft is sufficient to produce temporary disengagement between the leaf spring 53 and the contact 57. The contacts become engaged again as the shaft comes back towards its fully rotated position and therefore at least two distinct indications of closure of these contacts and sometimes more are produced. The external circuitry cannot properly interpret such signals and often indicates more than one closure and other times indicates no closure at all. Therefore the cam and cam follower arrangement is employed, as illustrated in FIGURES 12 and 13, so that there is no direct mechanical coupling between the shaft 62, which carries the sensing bail, and the shaft 97 of the rotary solenoid. The cam and cam follower arrangement numerals 81 through 83 permits the cam surface 82 to be contoured such that the amount of rotation of the plate 76 resulting from the bounce of the shaft 97 is insufficient to cause the cam follower 81 to engage portions of the surface 82 having different displacements from the shaft 86. Therefore, so far as the cam follower is concerned the cam surface remains stationary even though in effect the arm 83 oscillates somewhat about the shaft 86.

As has been previously mentioned, the sensing pins are fabricated from a self-lubricating, rigid, insulating material, preferably Delrin. The fact that the pins are self-lubricating eliminates the necessity for oiling and the fact that they are fabricated from insulating material eliminates the use of insulating caps required when employing steel pins. Also, since the pins are soft relative to the guide block, the block lasts indefinitely and requires far less material along the guiding surface as a result.

While I have described and illustrated one specific embodiment of my invention, it will be clear that variations of the details of construction which are specifically illustrated and described may be resorted to without departing from the true spirit and scope of the invention as defined in the appended claims.

I claim:

1. A reading mechanism for sensing apertures in a perforated record member comprising a plurality of sensing pins, means for biasing said pins toward the record member, a bail for engaging said pins, a source of oscillatory mechanical movement movable along a prescribed arc between energized and de-energized positions, and coupling means interconnecting said bail and said source of power such that said bail is positioned to hold said sensing pins away from said record member when said source is de-energized, said coupling means positioning said bail such as to permit said pins to move toward said record member when said source is energized, said coupling means including a lost motion mechanism effective only at the end of movement of said source along said prescribed arc from its de-energized to energized positions.

2. The combination according to claim 1 wherein said pins are fabricated from a self-lubricating rigid insulating member.

3. A reading mechanism for sensing apertures in a perforated record member comprising a plurality of sensing pins, said sensing pins being an elongated cylinder having a first section of reduced diameter and a shoulder between said first section and the remainder of said pin, a guide block for said pins, said guide block having a plurality of axially parallel apertures, each of said apertures reciprocably receiving the first section of a different one of said sensing pins, means engaging an end of each of said sensing pins remote from said first section of said sensing pins for biasing said pins towards said guide block, a bail having a plurality of apertures, each of said apertures of said bail receiving the first section of a different one of said pins, said bail being disposed between said guide block and said shoulders on said pins, and drive means causing said bail to move into and out of contact with said shoulders on said pins.

4. The combination according to claim 3 wherein said drive means comprises a shaft disposed remote from and parallel to the row of sensing pins, said bail being secured to said shaft and means for oscillating said shaft.

5. A reading mechanism for an elongated perforated record member comprising means for feeding and guiding the record member through a reading station, said feeding and guiding means comprising a sprocket having teeth for engaging a row of feed holes in the record member, means for intermittently rotating said sprocket, means for holding the record member on said sprocket, a side wall extending parallel to the direction of movement of the record member, a fixed guide post spaced from said wall by a spacing equal to the width of the widest record member to be read, first and second reciprocable guide post located from said wall and said fixed post, respectively, by spacings equal to the width of the narrowest record member to be read, means for biasing said first and second posts toward the record member, a plurality of sensing pins located between said guide posts and said sprocket, means for biasing said pins towards the record member and means for holding said pins away from the record member and periodically permitting them to move toward the record member.

6. A reading mechanism for sensing apertures in a perforated record member comprising a plurality of sensing pins, means for biasing said pins toward the record member, a bail for engaging said pins, a source of oscillatory mechanical movement movable along a prescribed arc between a retracted and sensing positions, and coupling means interconnecting said bail and said source of power such that said bail is positioned to hold said sensing pins away from said record member when said source is in its retracted position, said coupling means positioning said bail such as to permit said pins to move toward said record member when said source is in its sensing position, said coupling means including a lost motion mechanism effective only at the end of movement of said source along said prescribed arc from its retracted to sensing positions.

7. The combination according to claim 6 wherein said sensing pins are elongated cylinders having a portion of reduced diameter adjacent the record member, said bail having apertures each for receiving a portion of reduced diameter of one of said pins.

8. The combination according to claim 6 wherein said source is a source of oscillatory motion and said lost motion mechanism comprises a cam and cam follower, said cam being secured to said source for oscillation thereby, said cam follower being connected to said bail.

9. The combination according to claim 8 wherein said lost motion mechanism comprises a portion of said cam contoured such that rotation thereof permits said cam follower to remain stationary.

References Cited by the Examiner

UNITED STATES PATENTS

| | | |
|---|---|---|
| 2,781,973 | 2/1957 | Baer et al. |
| 2,819,020 | 1/1958 | Baer et al. |
| 3,051,381 | 8/1962 | Drillick _____ 235—61.11 |

MALCOLM A. MORRISON, *Primary Examiner.*

DARYL W. COOK, *Examiner.*

W. S. POOLE, *Assistant Examiner.*